(12) United States Patent
Rychnovsky

(10) Patent No.: US 10,555,513 B1
(45) Date of Patent: Feb. 11, 2020

(54) METHOD AND APPARATUS FOR MEASURING TROLL DEPTHS

(71) Applicant: Raymond E. Rychnovsky, Pleasanton, CA (US)

(72) Inventor: Raymond E. Rychnovsky, Pleasanton, CA (US)

( * ) Notice: Subject to any disclaimer, the term of this patent is extended or adjusted under 35 U.S.C. 154(b) by 0 days.

(21) Appl. No.: 16/435,318

(22) Filed: Jun. 7, 2019

(51) Int. Cl.
*A01K 91/08* (2006.01)
*G01B 5/24* (2006.01)
*G01B 5/18* (2006.01)
*G06F 17/11* (2006.01)

(52) U.S. Cl.
CPC ........... *A01K 91/08* (2013.01); *G01B 5/18* (2013.01); *G01B 5/24* (2013.01); *G06F 17/11* (2013.01)

(58) Field of Classification Search
CPC . G01B 5/18; G01B 5/24; A01K 91/08; A01K 97/10
USPC .......................................................... 33/719
See application file for complete search history.

(56) References Cited

U.S. PATENT DOCUMENTS

| | | | | |
|---|---|---|---|---|
| 2,669,785 A * | 2/1954 | Rydzewski | ............ | A01K 91/20 33/719 |
| 3,149,419 A * | 9/1964 | Koznarski | ............. | A01K 91/20 33/713 |
| 3,253,337 A * | 5/1966 | Ebert | ...................... | A01K 91/20 33/354 |
| 4,338,565 A | 7/1982 | Hall | | |
| 4,586,286 A * | 5/1986 | Cheatham, Jr. | ........ | A01K 91/08 33/720 |
| 5,131,165 A | 7/1992 | Benson | | |
| 6,505,412 B2 * | 1/2003 | Hauzie, Jr. | ............. | G01B 3/563 33/1 N |
| 6,658,755 B2 | 12/2003 | Arlinsky | | |
| 2005/0166411 A1 | 8/2005 | Scorvo | | |
| 2005/0200836 A1 | 9/2005 | Scorvo | | |

OTHER PUBLICATIONS

Scorvo and Rychnovsky, "Neurotic Enterprises presents: The SmartReel", product brochure, 2004 (2 pp).
Keelin and Pauli, "Ruling Your Fly Depth," Fly Fisherman Magazine, Dec. 2017 (5 pp).
Deep Trout, "Measure the Catenary Depth of Your Bait," https://deeptrout.wordpress.com/2010/10/17/measure-the-catenary-depth-of-your-bait/, Oct. 17, 2010 (2 pp).
Deep Trout, "Lead Core Sink per Color Guestimator," https://deeptrout.wordpress.com/2010/10/13/lead-core-sink-per-color-guestimator/, Oct. 13, 2010 (1 p).
Deep Trout, "Lead Line Trolling Depth," https://deeptrout.wordpress.com/2010/10/07/lead-line-trolling-depth/, Oct. 7, 2010 (2 pp).
Rychnovsky, "The Troller's Handbook for All American Fish Species," Frank Amato Publications, Inc., 1998, Chapters 9, 10, and 11 (pp. 48-71).

* cited by examiner

Primary Examiner — Yaritza Guadalupe-McCall
(74) Attorney, Agent, or Firm — Silicon Edge Law Group LLP; Arthur J. Behiel

(57) ABSTRACT

Described are instruments for measuring troll depths of a line, of a known length, drawn through water and having a proximal line end out of the water and a weighted, distal line end in the water. The instruments include a reference to align with the line near the proximal line end to sense the insertion angle of the line. A nonlinear depth scale marks troll depths as a polynomial function of the length and angle of insertion, the angle of insertion measured relative to e.g. a horizontal or vertical reference.

16 Claims, 3 Drawing Sheets

METHOD AND APPARATUS FOR MEASURING TROLL DEPTHS

BACKGROUND

Trolling from a boat is a favorite and very effective way to catch most freshwater and saltwater fish. The troll depth of the lure or bait is important in finding and catching fish but it is usually not known.

For most conventional trolling an angler ties on his or her favorite bait or lure, and maybe trolling tackle like weights and fish attractors, and lets out the length of line that they think is appropriate. The line makes a shallow angle behind the boat and anglers usually think the lure or bait is shallow. The line makes an arc due to the downward pull of the weight, however, and thus extends deeper than it appears. Misapprehension of trolling depth often causes lures to miss targeted fish populations or snag the bottom.

Anglers have estimated line depth using basic trigonometry and assuming the line maintains the same angle from the lure or bait to the surface. This practice leads to considerable error for lines with appended weights, however, because the curvature of such a line increases as it approaches the distal end.

The inventor wrote and solved complex equations that produce accurate troll-depth estimations. These efforts are outlined in Ray Rychnovsky, "The Troller's Handbook for All American Fish Species" (1998). Mr. Rychnovsky details how four major factors influence line curvature, and thus troll depth. These factors are line diameter, the weight appended at or near the end of the line, trolling speed, and the length of the line below the water surface. Of these factors, trolling speed and the appended weight have the largest effects on troll depth. Recognizing the difficulty of graphing four factors, the Troller's Handbook provides charts and tables to aid the angler in estimating troll depth. As one can imagine, however, it can be cumbersome to measure and juggle the major factors that influence line curvature, and thus to maintain an accurate sense of troll depth.

BRIEF DESCRIPTION OF THE DRAWINGS

The subject matter disclosed is illustrated by way of example, and not by way of limitation, in the figures of the accompanying drawings and in which like reference numerals refer to similar elements and in which.

DETAILED DESCRIPTION

Mr. Rychnovsky reviewed hundreds of calculations in preparing equations and tables that account for the major factors influencing the curvature of a weighted trolling line. After years of work he was surprised to find that troll depth can be computed accurately over the commonly used ranges of these variables without consideration of line width, weight, or speed. Mr. Rychnovsky noticed that varying any of (1) the diameter of a trolled line, (2) the weight appended to the distal end of the line, and (3) the trolling speed changes the line's insertion angle in proportion to troll depth in a predictable way. This epiphany lead Mr. Rychnovsky to produce equations that allow anglers to find troll depth without regard to weight, trolling speed, or line diameter; only line length and insertion angle are required. The profound mathematical simplification that resulted from Mr. Rychnovsky's efforts led to the development of simple and inexpensive instruments for measuring troll depths. These instruments can be used to advantage when the force at the end of the line is applied by e.g. a fishing weight, diving lure, bait, or a diving plane.

Figure 1:
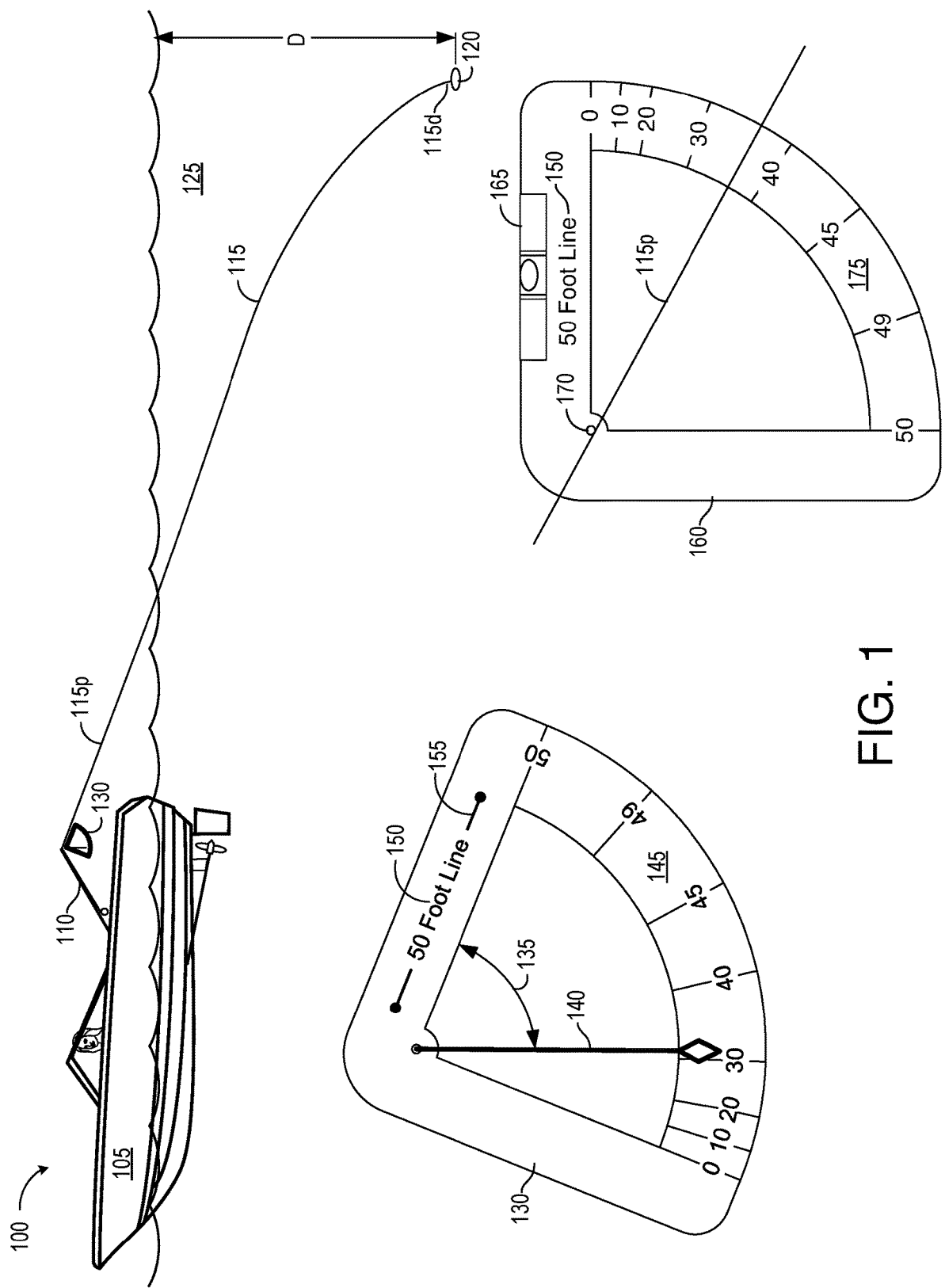
FIG. 1 depicts a trolling scenario 100 in which a boat 105 with fishing pole 110 is trolling a line 115 that extends from a proximal line end 115$p$ to a distal line end 115$d$ attached to a lure 120 (e.g. one or more of a weight, diving plane, bait, or lure).

FIG. 1 depicts a trolling scenario 100 in which a boat 105 with fishing pole 110 is trolling a line 115 that extends from a proximal line end 115$p$ to a distal line end 115$d$ attached to a lure 120 (e.g. one or more of a weight, diving plane, bait, or lure). As noted previously, line 115 has a curvature that is a function of line diameter and length (predominantly the length under water 125), the weight of lure 120, and the trolling speed of boat 105 to the left of the page. (Trolling speed is relative, also applying between a stationary angler and moving water.) An instrument 130 for measuring troll depths is aligned with line 115 beneath distal end 115$d$—an action generally taken from a boat—to take a measurement of line insertion angle.

Instrument 130, detailed at lower left, includes a vertical plumb line 140 that indicates troll depth on a depth scale 145 that is a nonlinear function of line insertion angle 135. Instrument 130 includes a line-length designation 150 and a linear reference 155, the latter to align with proximal line end 115$p$ when taking a trolling-depth measurement. Linear reference 155 can be e.g. an edge of the instrument, two points, an elongated hook or pair of hooks for suspending instrument 130 from the line, etc. An angler trolling with fifty feet of submerged line and any of a range of weights and over a range of trolling speeds can measure troll depth D by aligning reference 155 with proximal line end 115$p$ and viewing where plumb line 140 points on scale 145.

Nonlinear scale 145 provides troll depth D as a function of line length L, where L is the submerged portion of line 115, and insertion angle A. Scale 145 has an array of markings from zero to fifty feet that mark troll depths at angles relative to linear reference 155. Scale 145 is nonlinear in that the depth markings exhibit nonlinear angular spacings relative to reference 155. While there are multiple ways to calculate the relative positions of the depth markings, those of this embodiment are computed using a polynomial K that maps well over line width, weight, or speed over the commonly used ranges of these variables. In mathematical form:

$$D = K * L \qquad \text{Eq. 1}$$

Most accurate for line lengths L from 25 feet to 200 feet but acceptable outside these bounds, polynomial K can be expressed as:

$$K = 6.1508E\text{-}10 A^5 - 1.7773E\text{-}07 A^4 + 2.0439E\text{-}05 A^3 - 1.2613E\text{-}03 A^2 + 4.8206E\text{-}02 A + 8.2551E\text{-}03 \qquad \text{Eq. 2}$$

Curves generated for various line lengths using values of K are not exact but afford depth calculations accurate enough for anglers. In this example, scale 145 of instrument 130 marks depths that are rounded from the product of fifty feet and a range of insertion angles A from zero to ninety degrees. Lower-order polynomials can also be used, though these generally offer lower accuracy.

FIG. 1, at bottom right, depicts a second instrument 160 for measuring troll depths. Instrument 160 includes a level 165 to provide a horizontal reference. Alternatively, instrument 160 can be equipped with a plumb bob to provide a vertical reference. A pin 170, made to rest against line 115p with level 165 level, causes line 115p to extend across a scale 175 that is a nonlinear function of insertion angle. Scale 175 indicates troll depth for line-length designation 150, fifty feet in this example. Pin 170 can be omitted in place of e.g. a hole or mark with which to align line 115p. In other embodiments instrument 160 can be fixed to a mount that holds the instrument in the proper orientation, allowing anglers to visually align their lines with scale 175. In still other embodiments instrument 160 lacks level 165 but is rather clipped to line 115p at the location of pin 170 and bottom weighted to align itself in the depicted orientation.

Figure 2:
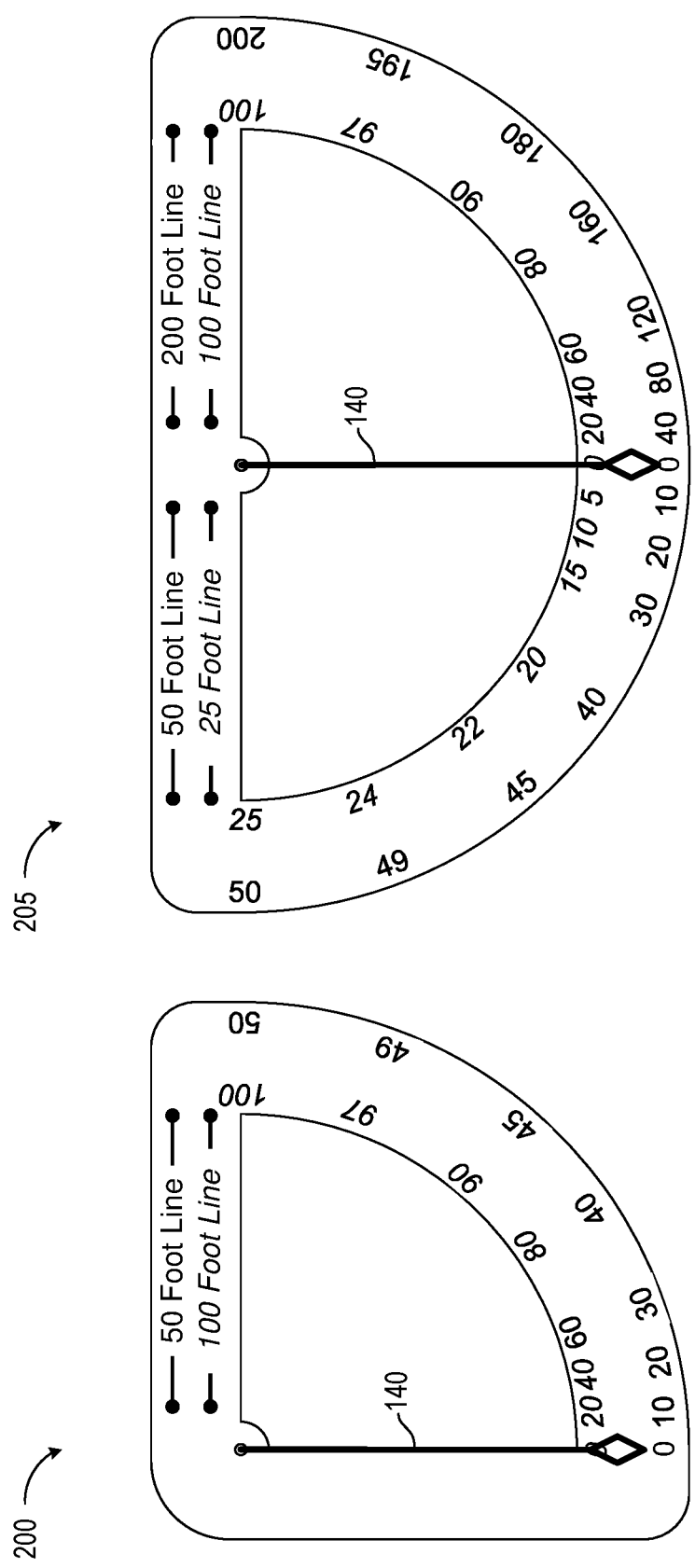
FIG. 2 depicts a pair of instruments 200 and 205, each for measuring troll depths for multiple line lengths.

FIG. 2 depicts a pair of instruments 200 and 205, each for measuring troll depths for multiple line lengths. Instrument 200 includes two depth scales, an exterior scale computed for fifty feet for angles of from zero to ninety degrees and an interior scale computed for 100 feet for the same range of angles. Depth scales can be computed using e.g. equations of the type described in the above-referenced Troller's Handbook. Alternatively, each scale can be computed using the foregoing Equations 1 and 2.

Instrument 205 includes four depth scales similarly derived using K but for line lengths of 25, 50, 100, and 200 feet. Though not shown, the back sides of instruments 200 and 205 can similarly include scales for different line lengths, additional scales can be provided on either or both faces, and troll depths can be interpolated between scales. Instruments in accordance with these and other embodiments can be made to provide troll depth measurements for broad ranges of line lengths of interest to anglers.

Some embodiments employ a depth scale calibrated for use with weighted lines, like metal or lead-core fishing lines, which tend to extend straight as a consequence of evenly distributed weight. Such a scale might be included on the same tool with scales of the type detailed in connection with FIG. 1. For example, an instrument or portion of an instrument designated for fifty-foot lines can include two scales, one for end-weighted lines and another for weighted lines.

Figure 3:
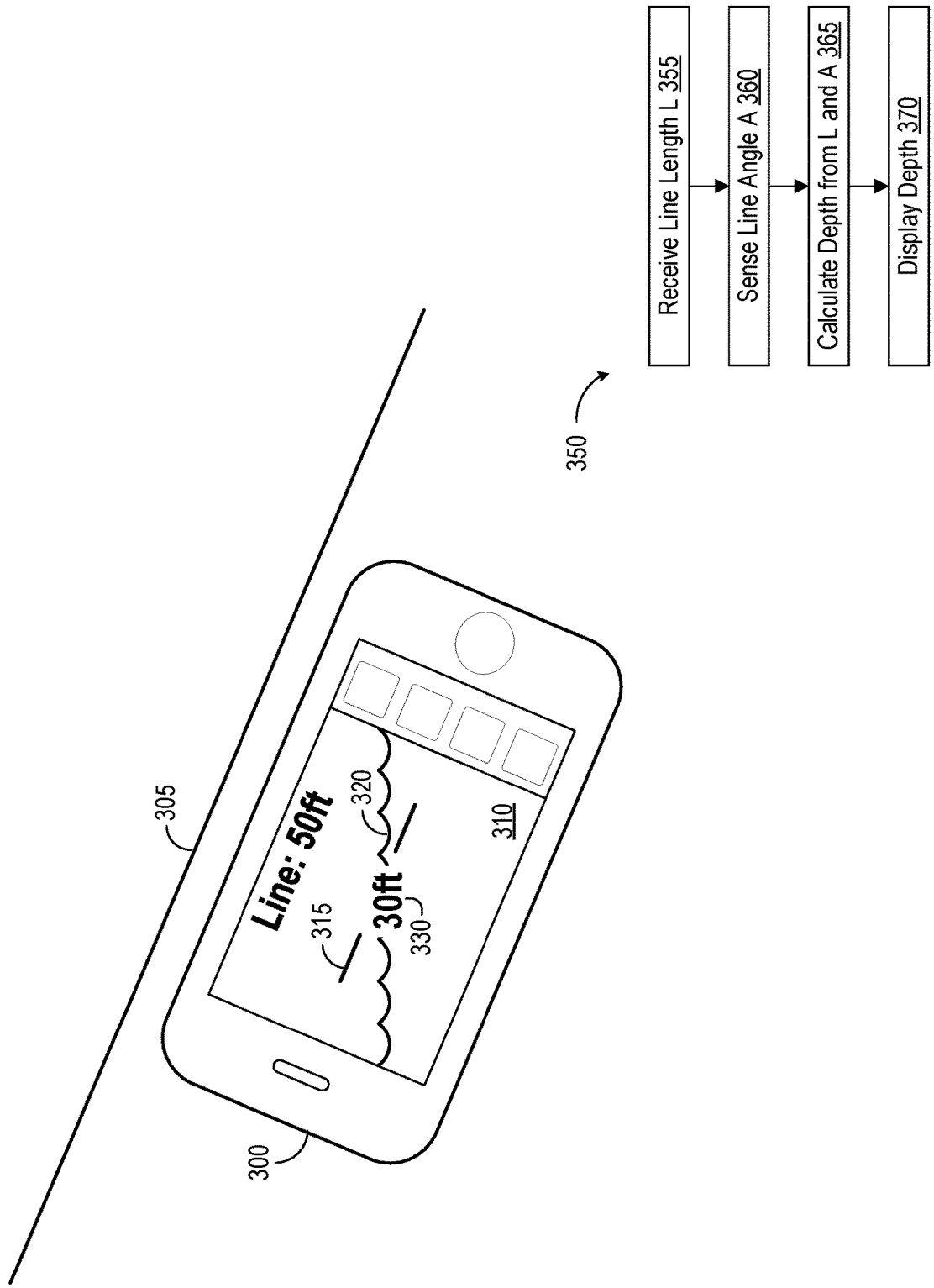
FIG. 3 depicts a mobile device 300 programmed with an application for measuring troll depth of a line 305 (e.g., a fishing line) based on line length and insertion angle.

FIG. 3 depicts a mobile device 300, such as an iPhone™ available from Apple Inc. of Cupertino, Calif., programmed with an application, or "app," for measuring troll depth of a line 305 (e.g., a fishing line) based on line length and insertion angle. Device 300 can sense insertion angle by interpreting data from integrated accelerometers (not shown).

Device 300 has a screen 310 that illustrates angle relative to horizontal using line segments 315 and iconic water surface 320 and provide a measure of depth 330 calculated from line length and angle according to equations 1 and 2, supra. As illustrated using a flowchart 350, device 300 receives from an angler a line length (355) and senses line angle when placed in alignment with line 305 (360). Device 300 calculates troll depth as a function of L and A, as by multiplying the line length by equation 1 (365) and displays and/or calls out troll depth (370).

While the foregoing discussion details certain instruments and methods for measuring troll depths for fishing lines and lures, these methods can be applied to measure troll depths for other types of cords, cables, and payloads. Variations of these embodiments will be obvious to those of ordinary skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

I claim:

1. An instrument for measuring troll depths of a line drawn through water and having a proximal line end out of the water and a weighted, distal line end in the water, the instrument accounting for a curve of the line in the water, the instrument comprising:
   a reference to align with the line near the proximal line end;
   a length designation identifying a length of the line extending in the water between the proximal line end and the distal line end; and
   a depth scale having depth markings marking the troll depths at angles relative to the reference, wherein the depth markings exhibit nonlinear angular spacings relative to the reference, the depth markings marking the troll depths of the weighted, distal line end of the line accounting for the curve of the line in the water.

2. The instrument of claim 1, wherein the reference comprises an edge of the instrument.

3. The instrument of claim 1, each of the depth markings indicating a corresponding one of the troll depths at one of the angles relative to the reference, where each marked depth is a product of the length of the line and a polynomial function of the corresponding one of the angles.

4. The instrument of claim 3, wherein the polynomial function is at least a third-order polynomial function.

5. The instrument of claim 4, wherein the polynomial function is a fifth-order polynomial function.

6. The instrument of claim 1, each of the depth markings indicating a corresponding one of the troll depths at one of the angles relative to the reference, where each marked depth is a product of the length of the line and a polynomial function of the corresponding one of the angles, and wherein the polynomial function is $6.1508\text{E}{-}10 A^5 - 1.7773\text{E}{-}07 A^4 + 2.0439\text{E}{-}05 A^3 - 1.2613\text{E}{-}03 A^2 + 4.8206\text{E}{-}02 A + 8.2551\text{E}{-}03$.

7. The instrument of claim 1, wherein the line is a fishing line.

8. The instrument of claim 1, further comprising:
   a second length designation identifying a second length of the line; and
   a second depth scale marking second troll depths at second angles relative to the reference.

9. The instrument of claim 1, wherein the instrument has two sides, a first side having the first-mentioned depth scale and a second side having the second depth scale.

10. The instrument of claim 1, further comprising a plumb line to indicate the troll depths relative to the reference.

11. The instrument of claim 1, further comprising a level.

12. The instrument of claim 1, wherein the length of the line consists of a portion of the line in the water.

13. A method of measuring a troll depth of a curved line drawn through water along a relative direction of movement and having a proximal line end and a weighted, distal line end, the method comprising:
   determining an insertion angle of the curved line at the proximal line end, the insertion angle between a straight line defined by the proximal line end and the relative direction of movement;
   determining a length of the curved line in the water and between the proximal line end and the distal line end; and
   multiplying the length of the curved line in the water by a polynomial function of the insertion angle to calculate the troll depth of the distal line end of the curved line.

14. The method of claim 13, wherein the polynomial function is at least a third-order polynomial function.

15. The method of claim 14, wherein the polynomial function is a fifth-order polynomial function.

16. The method of claim 13, wherein the polynomial function is 6.1508E-10A^5−1.7773E-07A^4+2.0439E-05A^3−1.2613E-03A^2+4.8206E-02A+8.2551E-03.

* * * * *